(No Model.)

A. BYINGTON.
SCRAPER FOR DISK HARROWS.

No. 492,385. Patented Feb. 28, 1893.

Witnesses:
J. S. Clark
L. A. Clark

Inventor:
Albert Byington
By A. O. Behel,
Atty

UNITED STATES PATENT OFFICE.

ALBERT BYINGTON, OF ROCHELLE, ILLINOIS.

SCRAPER FOR DISK HARROWS.

SPECIFICATION forming part of Letters Patent No. 492,385, dated February 28, 1893.

Application filed August 29, 1892. Serial No. 444,375. (No model.)

*To all whom it may concern:*

Be it known that I, ALBERT BYINGTON, a citizen of the United States, residing at Rochelle, in the county of Ogle and State of Illinois, have invented certain new and useful Improvements in Scrapers for Disk Harrows, of which the following is a specification.

The object of this invention is to provide scrapers for disk harrows, each disk having a scraper independent of the scrapers of the remaining disks so far as its clearing action is concerned, and which is automatic in its operation, that is when the disks are free from dirt the scrapers will be inoperative but as soon as the dirt collects upon the disks the scraper is immediately brought into action and the disk cleaned and when it has completed its work it will drop out of contact with the disk.

Figure 1:
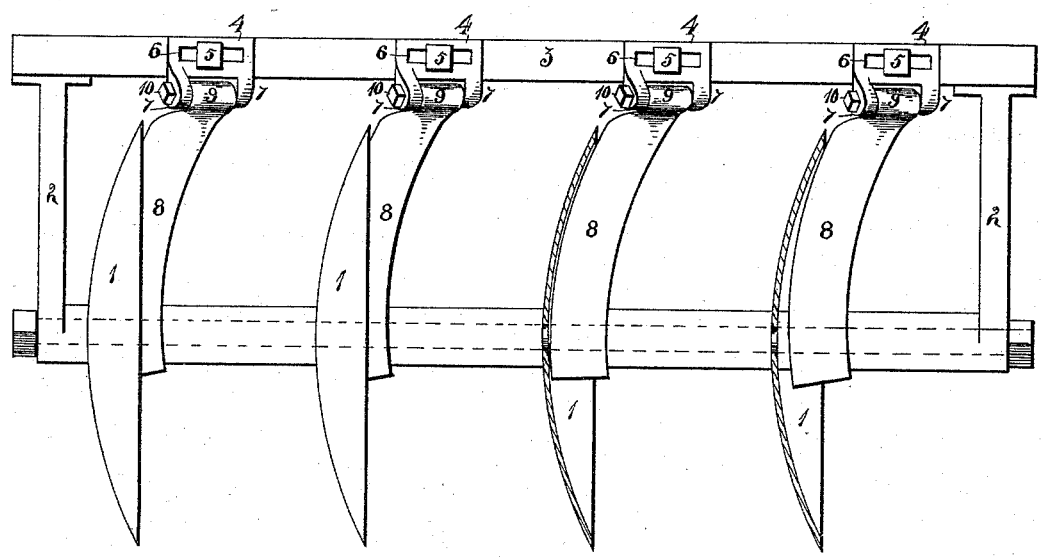
Figure 2:
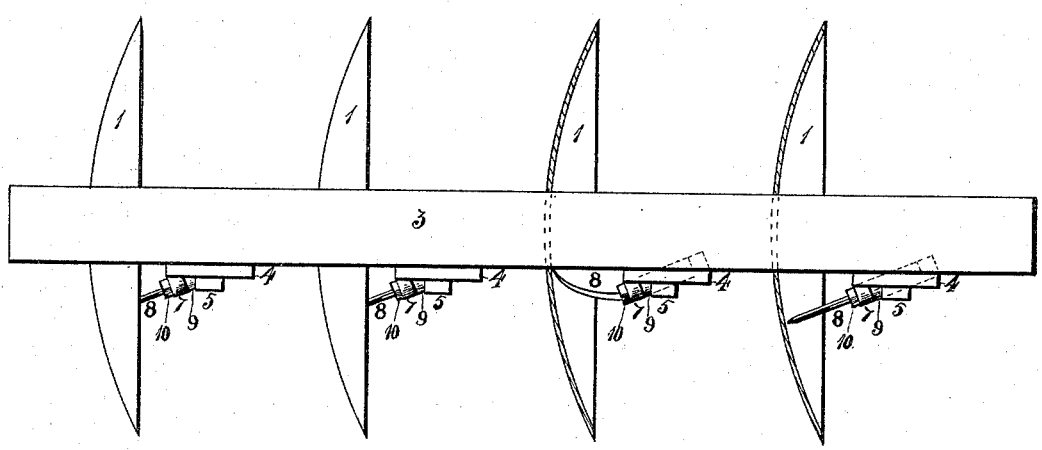

In the accompanying drawings—Figure 1 is an elevation of a section of a disk harrow. Fig. 2 is a top view of the same.

The section of the disk harrow represented in the drawings is of the usual construction, consisting of a series of disks 1, mounted upon a central shaft and held separated by bearings 2 have a connection with the central shaft and connect the disks with a beam 3. To the beam 3 are secured brackets 4, by a bolt 5 passing through the lengthwise slot 6 therein. From this bracket extend ears 7 and a scraper 8, having its upper end 9 in eye form and is held between the ears by a bolt 10.

The scrapers hang loosely upon their pivot and conform as nearly as may be to the inner surface of the disks. When the disks are free from mud the scrapers hang in a vertical position or direct from their pivot, but as soon as mud begins to accumulate upon the inner surface of the disks it will come in contact with the scraper and cause it to move toward the center of the disk until it strikes against the hub of the disk or center shaft and will remain in this position until dirt ceases to accumulate upon the inner surface of the disk, and as the scraper when in this position conforms closely to the inner surface of the disk all mud will be scraped from the inner surface of the disk and as soon as dirt ceases to accumulate upon the inner surface of the disk the scrapers will drop by gravity to their normal positions when they will be supported upon their pivot free from the disks. In this instance I have located the pivot from which the scraper suspends at an angle to the axis upon which the disks revolve, which I have found allows the scrapers to more nearly conform to the inner surface of the disks throughout their swinging movement.

I claim as my invention—

1. A harrow composed of a series of disks, and a scraper for each disk, the scrapers located on the concave side of the disk and having a swinging movement independent of the others, said scrapers held from the disks by action of gravity and brought into scraping contact with the disks by the accumulation of dirt on the concave side thereof.

2. A harrow composed of a series of disks, scrapers for the disks, each scraper having a swinging movement independent of the others, said scrapers held from the disks by action of gravity and brought into scraping contact with the disks by the accumulation of dirt on the concave side thereof the axis upon which the scrapers are supported standing at an angle to the lengthwise axis of the disk.

ALBERT BYINGTON.

Witnesses:
BENJAMIN F. BUTLER,
A. O. BEHEL.